United States Patent [19]
Smith

[11] 3,824,857
[45] July 23, 1974

[54] TEMPERATURE MEASURING SYSTEM FOR ROTATING MACHINES
[75] Inventor: Forest D. Smith, Saint Louis Park, Minn.
[73] Assignee: Electric Machinery Mfg. Company, Minneapolis, Minn.
[22] Filed: Aug. 7, 1972
[21] Appl. No.: 278,578

[52] U.S. Cl. ............................. 73/351, 340/207 R
[51] Int. Cl. .......................................... G01d 5/12
[58] Field of Search .......... 73/351, 361; 340/207 R, 340/195, 208, 227 R

[56] References Cited
UNITED STATES PATENTS
| | | | |
|---|---|---|---|
| 2,556,556 | 6/1951 | Schmitt | 340/207 R |
| 3,082,400 | 3/1963 | Coop | 340/208 |
| 3,225,597 | 12/1965 | Englehard | 73/361 |
| 3,268,880 | 8/1966 | Miller | 340/195 |

Primary Examiner—Richard C. Queisser
Assistant Examiner—Denis E. Corr
Attorney, Agent, or Firm—Merchant, Gould, Smith & Edell

[57] ABSTRACT

A temperature measuring system for measuring the rotor temperature of an electric motor or generator. A temperature signal from a thermocouple mounted on the rotor is amplified and used to run a voltage to frequency converter which generates a signal having a frequency proportional to the temperature. This signal is coupled from the rotating portion to the stationary portion of the machine where it is converted to an analog voltage proportional to the rotor temperature. In one embodiment a rotary transformer is used to couple the signal from the rotating portion to the stationary portion of the machine, while in another embodiment an FM transmitter and receiver is used for the signal coupling.

8 Claims, 2 Drawing Figures

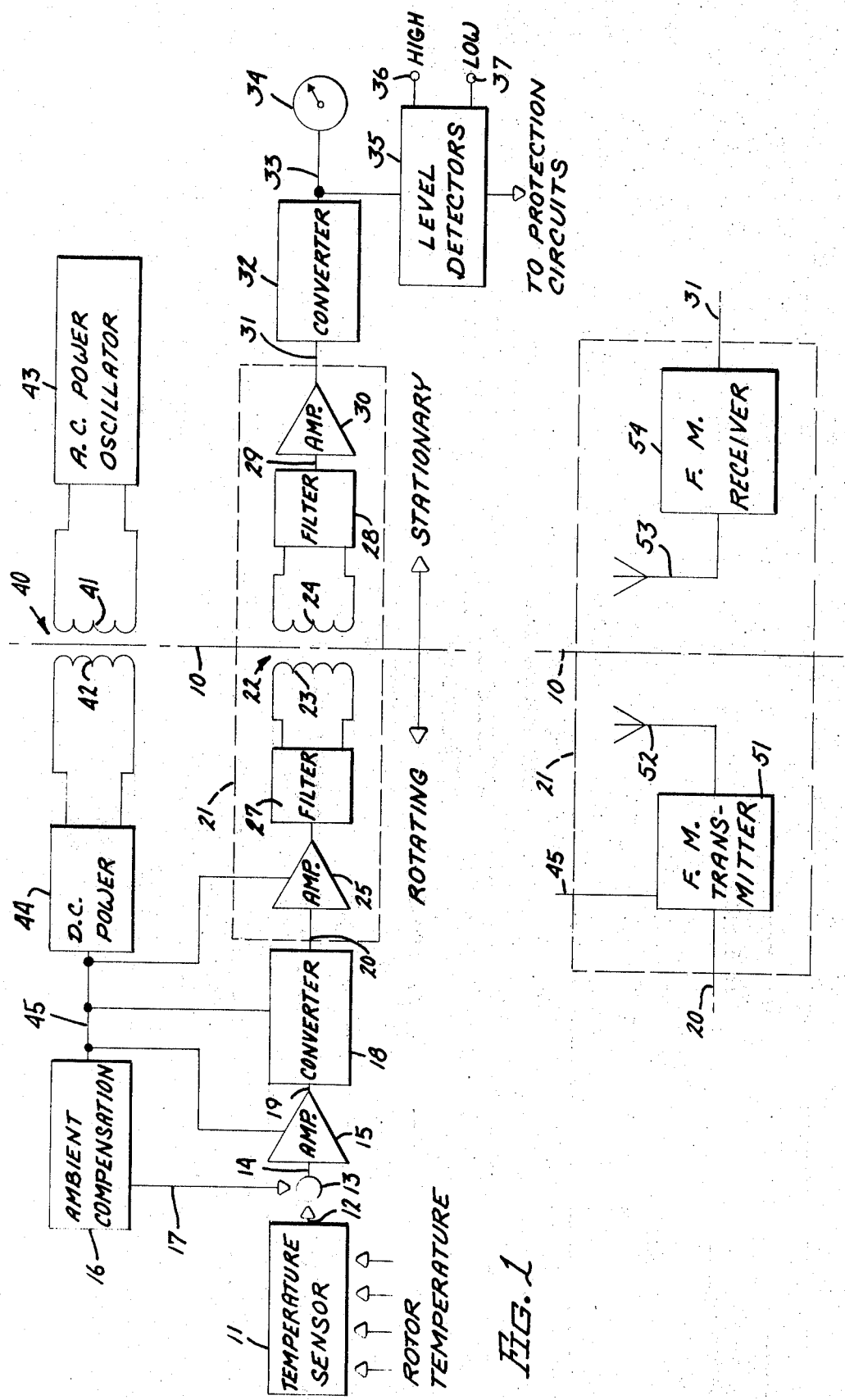

3,824,857

TEMPERATURE MEASURING SYSTEM FOR ROTATING MACHINES

BACKGROUND OF THE INVENTION

The present invention pertains generally to temperature measuring systems, and more particularly to systems for measuring the temperature of the rotating portion of a rotary machine, such as an electric motor or generator.

In the operation of large rotating electrical machinery it is often necessary to monitor the temperature of various portions of the machine so that it can be protected from conditions causing potentially damaging high temperatures such as short circuits, sudden overloads, and the like. While measurement of temperatures on the stationary portion of the machine presents little difficulty, measurement of the rotor temperature involves the problem of transferring the data from the rotating to the stationary portion of the machine. One prior art solution to this problem is the use of slip rings and brushes. However, this solution suffers from the disadvantages of mechanical wear requiring continual maintenance, and the introduction of a high level of electrical noise.

Other proposed systems have employed rotary transformers for coupling an electrical temperature signal from the rotating to the stationary portion of the machine. One prior art system uses a temperature sensitive capacitor in a resonant circuit attached to the rotor and connected to a rotary transformer. Changes in the resonant frequency of the circuit, as determined by additional circuitry coupled to the resonant circuit via the rotary transformer, are used to give an indication of temperature. In another prior art system, a temperature sensor provides an electrical signal which is used to modulate an excitation signal brought to the rotor on a first rotary transformer. The modulated signal is then taken off the rotor by a second rotary transformer. In many applications, both of these prior art systems are subject to inaccuracies caused by variations in the effective signal coupling of the rotary transformer. This change in coupling is due to axial movements of the rotor shaft, which in many machines can reach sizable proportions. Since this variation in the rotary transformer coupling affects the amplitude of signals passed through the transformer, these prior art systems are subject to inaccuracies of measurment caused by the shaft axial movement. In addition, the double transformer prior art system mentioned above suffers the added disadvantage of requiring extensive magnetic shielding between the first and second rotary transformers to prevent erroneous readings due to pickup of the excitation voltage by the second transformer.

In order to overcome these and other disadvantages of the prior art, the present invention provides a system wherein the transmission of temperature data from the rotor to the stationary portion of the machine is insensitive to the variations in amplitude such as those caused by variations in the signal coupling means. Further, the present invention does not require special shielding and yet has a high resistance to noise pickup. These performance features are achieved through the use of signal conversion so that the frequency, rather than the amplitude, of the signal coupled from rotating to the stationary portion of the machine conveys the temperature information.

Specifically, the present invention provides a temperature monitoring or measuring system for monitoring the rotor temperature of a machine having a rotating portion and a stationary portion. Temperature sensing means produce a rotor temperature signal, while signal conversion means associated with the rotor converts the temperature signal to an intermediate signal having a frequency indicative of the rotor temperature. Signal coupling means, which may be a rotary transformer or an FM transmitter and receiver, couples the intermediate signal from the rotating portion to the stationary portion of the machine, and output means receive the intermediate signal and utilize it to produce an output signal indicative of the temperature of the rotor.

BRIEF DESCRIPTION OF THE DRAWINGS

FIG. 1 is a block diagram of one embodiment of the temperature measuring system of the present invention; and FIG. 2 is a block diagram of alternate coupling means which may be used in the temperature measuring system of FIG. 1.

DESCRIPTION OF THE PREFERRED EMBODIMENT

In the temperature monitoring system shown in FIG. 1, all elements to the left of line 10 are associated with the rotating portion of the machine whose temperature is being monitored, while all items to the right of line 10 are associated with the stationary portion of the machine. A temperature sensor 11 is attached to the rotating portion of the machine. Temperature sensor 11 may be any type of device that produces a usable output signal in response to temperature. For example, in one embodiment of the present invention, a thermocouple is used as the temperature sensor. Preferably the thermocouple should be placed near or attached to a critical portion of the rotor, such as armature windings, rotor cage, or the like. Temperature signals produced by temperature sensor 11 are conveyed by lead 12 to a bridge circuit 13, and then via lead 14 to a DC amplifier 15. A temperature compensation resistance 16 provides signals to the summing bridge 13 via a lead 17 for ambient temperature compensation. The output of amplifier 15 is connected to a converter 18 by a lead 19.

Converter 18 is a voltage to frequency converter, and it functions to produce at its output on lead 20, an AC signal having a frequency proportional to the DC voltage applied to its input on lead 19. One type of circuit which may be used for this function is a unijunction transistor voltage controlled oscillator.

The apparatus inside dotted line 21 generally comprises signal coupling means for conveying the signals carrying the temperature data from the rotating portion to the stationary portion of the machine. In the embodiment shown in FIG. 1, a rotary transformer 22 and associated circuitry is used for this purpose. Rotary transformer 22 has a primary winding 23 which is attached to the shaft of the rotor of the machine (not shown) for rotation therewith. Rotary transformer 22 has a secondary winding 24 which does not rotate, but which is held in position concentric to primary winding 23. Signals from converter 18 pass through lead 20 to an AC amplifier 25, and then through lead 26 to a filter 27, which is connected to primary winding 23.

On the stationary side of the apparatus, secondary winding 24 is connected to another filter 28, which in turn connects through lead 29 to an AC amplifier 30. AC amplifier 30 connects through a lead 31 to a converter 32. Converter 32 is a frequency to voltage converter, and performs substantially the inverse of the function performed by converter 18. Specifically, converter 32 provides an output voltage on lead 33 which is proportional to the frequency of the signal applied to its input via lead 31. Conventional digital to analog converters can be used for performing this function.

The voltage on lead 33 is applied to output devices for indicating the temperature of the rotor. For example, a meter 34 is provided connected to lead 33. Meter 34 may be a voltmeter calibrated to read directly in degrees of rotor temperature. Also connected to lead 33 are level detectors 35. The level detectors function to generate alarm signals at terminals 36 and 37, when out of tolerance conditions exist. Level detectors 35 may comprise electronic circuitry for comparing the voltage on lead 33 against predetermined reference voltages corresponding to temperature tolerances. In another embodiment, adjustable mechanical or photoelectric devices movably positioned on meter 34 and operated by the passage of the meter needle may alternatively be used as level detectors.

A power supply is provided for bringing power to the rotor to operate the various circuits on the rotor. For this purpose a second rotary transformer 40, having a primary 41 associated with the stationary portion of the machine, and a secondary 42 associated with the rotor, is provided. Primary 41 is connected to receive alternating current power from an AC power oscillator 43. Secondary winding 42 is connected to deliver the AC power to a DC power supply 44. DC power supply 44 rectifies and filters the received AC power to supply a DC bias voltage to lead 45, and thence to temperature compensation resistance 16, DC amplifier 15, converter 18, and AC amplifier 25. In the preferred embodiment, AC power oscillator 33 operates at a relatively high frequency, for example about 12 kilohertz, for reasons which are explained in a subsequent paragraph.

Alternatively, it is possible to simply use a battery on the rotor in place of the above described circuitry for supplying DC bias power to the circuitry on the rotor. However, this solution is not preferred because of the added mass and because of the necessity for replacement of the battery.

A suitable source of DC power for operating AC amplifier 30, converter 32, and level detectors 35 is also provided, but is not shown in the drawing.

The operation of the embodiment of the invention shown in FIG. 1 is as follows. If temperature sensor 11 is a thermocouple, it produces a small DC potential indicative of the temperature of the rotor. However, it is necessary to compensate this signal according to the ambient temperature existing at the input to the electronic circuitry mounted on the rotor, which may be different than the temperature of the rotor cage or armature winding where the thermocouple is located. Compensation is provided by temperature compensation resistance 16 which may compries a thermistor or other temperature sensitive resistor. The DC bias signal from lead 45 experiences a voltage drop across the compensation resistance depending upon ambient temperature, and is combined with the temperature sensor signal by bridge circuit 13, so that the temperature signal applied to DC amplifier 15 is proportional to the absolute, rather than the relative, temperature of the rotor. DC amplifier 15 serves to step up the voltage of the signals to a level that is usable by converter 18. As previously mentioned, converter 18 converts the DC signal to an AC signal having a frequency proportional to the voltage. This frequency signal is an intermediate signal in that it is only used to convey the temperature information through the coupling means from the rotor to the stationary portion of the machine, where it is then reconverted so that the DC temperature signal is recovered.

In the embodiment shown in FIG. 1, the coupling function is performed by rotary transformer 22 and the circuitry enclosed within dotted line 21. AC amplifier 25 provides useful gain for transformer 22 while filter 27 functions to smooth out the amplified AC signals. For example, filter 27 may be a low pass filter for removing higher order harmonics which may have been introduced due to pulse type output characteristics of converter 18. The intermediate signals are coupled through rotary transformer 22 where they are picked up by secondary winding 24, filtered by filter 28, and amplified by AC amplifier 30 to a usable voltage level as may be required by the characteristics of converter 32.

Filter 28 is also a low pass filter and its purpose is as follows. The gain and scale factor of DC amplifier 15 and voltage to frequency converter 18 are chosen so that maximum expected temperature results in an intermediate signal frequency of about one or two kilohertz. As previously mentioned, a frequency of about twelve kilohertz is preferably used in AC power oscillator 43. Therefore, by making filter 28 a low pass filter with good cut off above 2 kilohertz, interference from the power supply which may be picked up by secondary winding 24 of the signal rotary transformer will be rejected by filter 28 so that the remainder of the system will be immune to power supply interference. In some embodiments, it may be desirable to provide another filter and amplifier similar to filter 28 and AC amplifier 30, inserted in series therewith in lead 31. Such an arrangement can provide a greater degree of noise rejection, if necessary.

As previously mentioned, converter 32 converts the intermediate frequency signal to a DC voltage proportional to the temperature of the rotor. In addition to the direct visual read out of temperature provided by meter 34, additional useful outputs are provided by the level detectors 35. A high threshold can be preset to correspond to the maximum permissible operating temperature of the rotor. Should this temperature be reached, a signal is provided at output 36 for activating an alarm circuit to warn an operator, or the signal can be coupled directly to motor protection circuits for automatic switching off of the machine. In addition to the high threshold, a low threshold can be provided to serve as a check on the temperature monitoring system itself. In this case, the threshold value selected should correspond to a temperature lower than the lowest operating temperature expected. Many of the possible failures that can occur in the monitoring system will result in a loss of signal. For example, if rotary transformer winding 23 burns out, or if the output of amplifier 25 becomes short circuited, to name two examples, the intermediate frequency will be lost. Zero frequency input to converter 32 causes the output voltage to drop to zero, thereby going below the low level threshold. Level detector 35 will then produce at output 37 indicating that something in the monitoring system has failed.

It will be appreciated that other types of output devices can be used instead of or in addition to the ones shown in FIG. 1. For example, a recording device can be connected to lead 33, as could a telemetry system for transmitting the temperature data to another location.

In FIG. 2 there is shown an alternate coupling means which may be used with the temperature monitoring system of FIG. 1. In FIG. 2, dotted line 10 represents the division between the rotating and stationary portions of the machine, with the rotating portion being on the left, as in FIG. 1. Associated with the rotating portion is a frequency modulation transmitter 51 connected to an antenna 52. Associated with the stationary portion of the machine is a frequency modulation receiver 54, connected to a receiving antenna 53. For use in the system of FIG. 1, the coupling means inside of dotted line 21 in FIG. 2 is substituted into FIG. 1 in place of the coupling means inside of dotted line 21 of FIG. 1. DC power is supplied to FM transmitter 51 from lead 45, and the intermediate frequency from converter 18 is applied to FM transmitter 51 by lead 20. The output of FM receiver 54 is connected to converter 32 by lead 31.

FM transmitter 51 functions in the conventional manner to generate a carrier signal, and modulate the carrier signal with the intermediate signal received from lead 20. This modulated carrier is then radiated by antenna 52, and picked up by antenna 53. In practice, it has been found that antenna 52 can be formed by a short piece of wire or other conductor placed near secondary winding 42 of power rotating transformer 40. Likewise, a short piece of wire placed near primary winding 41 will serve for antenna 53. FM receiver 54 functions in the conventional manner to demodulate the received carrier signal, recover the intermediate signal, and supply it to converter 32. The remainder of the elements in the system operate the same as in the system of FIG. 1, previously described.

Regardless of whether the transformer coupling means of FIG. 1 or the FM transmission means of FIG. 2 is used, the temperature information is conveyed from converter 18 to converter 32 by the frequency of the intermediate signal. Thus, any variation in the amplitude of the intermediate frequency as it passes through the coupling means is of no consequence. Therefore, variations in the coupling of rotary transformer 22 due to axial movements of the rotor shaft have no effect upon the operation and accuracy of the monitoring system. Also, shielding between power rotary transformer 40 and the signal coupling means is not required because of the inherent immunity to noise of the FM system of FIG. 2, and because of the action of filter 28 in the embodiment of FIG. 1.

While I have disclosed and described specific embodiments of my invention it is to be understood that this is for the purpose of illustration only and that my invention is to be limited solely by the scope of the appended claims.

I claim as my invention:

1. A temperature monitoring system for monitoring the rotor temperature of a machine having a rotation portion and a stationary portion, said system being independent of axial movements of the rotor shaft, comprising:
   a. temperature sensing means associated with the rotating portion for producing a temperature signal indicative of the temperature of the rotating portion;
   b. signal conversion means associated with the rotating portion and connected to receive the temperature signal from the temperature sensing means, the signal conversion means operable to produce an intermediate signal having a frequency indicative of the value of the temperature signal;
   c. signal coupling means associated with the rotating portion and the stationary portion of the machine and connected to receive the intermediate signal, the signal coupling means operable to convey the intermediate signal from the rotating portion to the stationary portion of the machine; and
   d. output means associated with the stationary portion of the machine and connected to receive the intermediate signal from the signal coupling means, the output means responsive only to the frequency of the intermediate signal and operable to produce output signals indicative of the temperature of the rotating portion, whereby the output signals are not affected by axial movements of the rotor.

2. A temperature measuring system for a machine having rotating portion and a stationary portion, for measuring the temperature of the rotating portion independently of any axial movement of the rotation portion, comprising:
   a. temperature sensing means attached for rotation with the rotating portion for producing a temperature signal having a voltage indicative of the temperature of the rotating portion;
   b. voltage to frequency conversion means attached for rotation with the rotating portion and connected to receive the temperature signal from the temperature sensing means, the voltage to frequency conversion means, the signal coupling means being operable to convey the intermediate signal from the rotating portion to the stationary portion of the machine; and
   d. frequency to voltage conversion means associated with the stationary portion of the machine and connected to receive the intermediate signal from the signal coupling means, the frequency to voltage conversion means being operable in response to the frequency of the intermediate signal to produce an output voltage indicative of the temperature of the rotating portion of the machine, whereby the output voltage is not affected by amplitude changes in the intermediate signal caused by axial movements of rotating portion of the machine.

3. The apparatus according to claim 2 wherein the temperature sensing means comprises a thermocouple.

4. The apparatus according to claim 3 wherein the temperature sensing means further comprises:
   a. a DC amplifier having input means and having an output connected to the voltage to frequency conversion means;
   b. temperature compensation resistance means; and
   c. means for connecting the thermocouple and the temperature compensation resistance means to the input means of the DC amplifier, so that the temperature signal produced is compensated for changes in ambient temperature.

5. The apparatus according to claim 2 further including level detection means connected to receive the output voltage, the level detection means operable to produce a first out of tolerance signal when the output voltage reaches a value corresponding to a predetermined maximum allowable rotor temperature, and a second out of tolerance signal when the output voltage reaches a value corresponding to a predetermined minimum expected rotor temperature.

6. The apparatus according to claim 2 further including:
   a. a power rotary transformer having a primary associated with the stationary portion of the machine, and a secondary associated with the rotating portion of the machine;
   b. an AC power supply connected to the primary; and
   c. rectification means connected to the secondary for receiving AC power, and connected to the voltage to frequency conversion means and the signal coupling means for supplying DC power thereto.

7. The apparatus according to claim 2 wherein the signal coupling means comprises:
   a. frequency modulation transmitting means associated with the rotating portion of the machine and connected to receive the intermediate signal, the frequency modulation transmitting means being operable to transmit a carrier signal modulated by the intermediate signal; and
   b. frequency modulation receiving means associated with the stationary portion of the machine and connected to the frequency to voltage conversion means, the frequency modulation receiving means being operable to receive the transmitted carrier signals and to demodulate and deliver the intermediate signal to the frequency to voltage conversion means.

8. The apparatus according to claim 2 wherein the signal coupling means comprises a signal rotary transformer having a primary associated with the rotating portion of a machine and connected to receive the intermediate signal of the voltage to frequency conversion means, and having a secondary associated with the stationary portion of the machine and connected to convey the intermediate signal to the frequency to voltage conversion means.

* * * * *